United States Patent [19]

Burgess

[11] 4,133,288
[45] Jan. 9, 1979

[54] DEVICE FOR INDICATING THE OPERATIVE POSITION OF A VALVE

[75] Inventor: Colin H. Burgess, Holcombe Brook, England

[73] Assignee: Dynamic Controls Limited, Oldham, England

[21] Appl. No.: 783,762

[22] Filed: Apr. 1, 1977

[30] Foreign Application Priority Data

Apr. 5, 1976 [GB] United Kingdom ............... 13648/76

[51] Int. Cl.² .......................................... F16K 37/00
[52] U.S. Cl. .................................. 116/277; 116/271; 137/553
[58] Field of Search .......................... 116/125, 114 G; 137/553, 556

[56] References Cited

U.S. PATENT DOCUMENTS

| 783,447 | 2/1905 | Meloon | 116/125 X |
| 1,107,800 | 8/1914 | Joynes | 137/556 X |
| 1,806,462 | 5/1931 | Hopkins | 116/125 |
| 2,930,344 | 3/1960 | Brasel | 116/125 |
| 3,134,570 | 5/1964 | Jarrett | 137/556 X |
| 3,554,160 | 1/1971 | Fortune et al. | 116/125 |

FOREIGN PATENT DOCUMENTS

| 797896 | 7/1958 | United Kingdom | 116/125 |
| 845266 | 8/1960 | United Kingdom | 116/125 |
| 934624 | 8/1963 | United Kingdom | 116/125 |

*Primary Examiner*—Daniel M. Yasich
*Attorney, Agent, or Firm*—Stevens, Davis, Miller & Mosher

[57] ABSTRACT

A rotary actuator for a valve is associated with an indicator mechanism provided entirely exteriorily to the housing of the valve and out of axial alignment with the valve spindle. The indicator rotates with an actuating member of the valve and is movable relative to a surface of the actuating member to provide a visual and tactile indication of the operative position of the valve.

25 Claims, 8 Drawing Figures

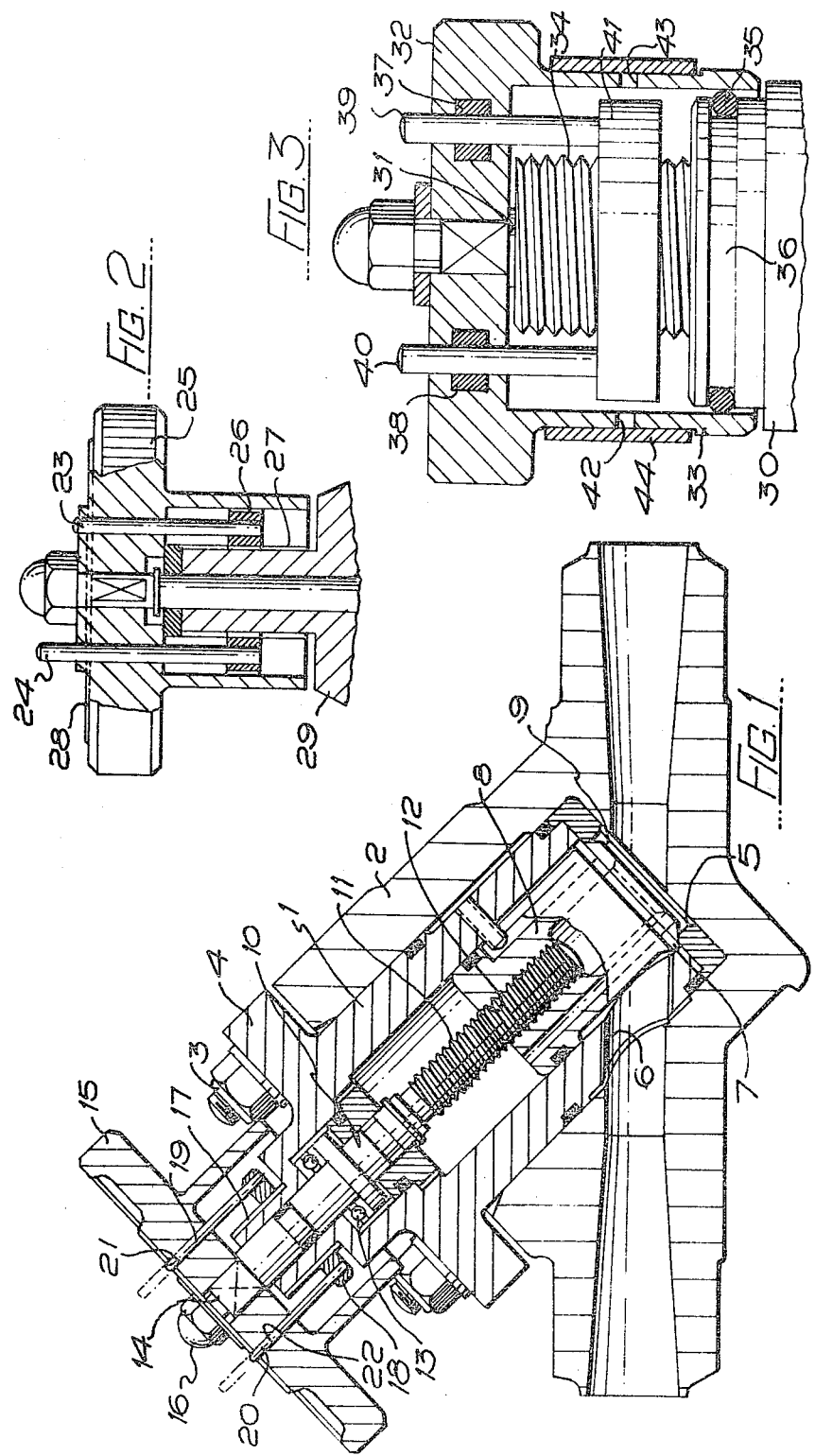

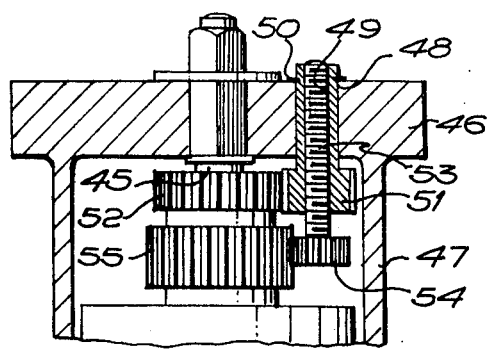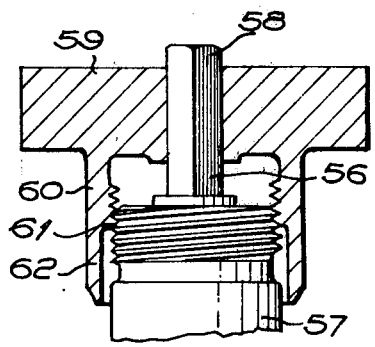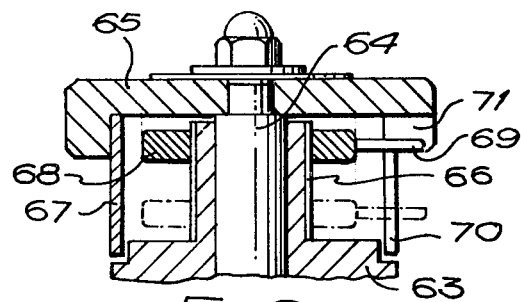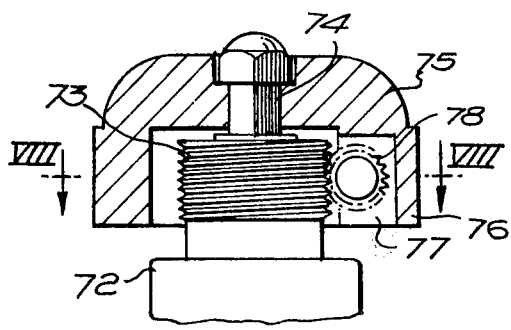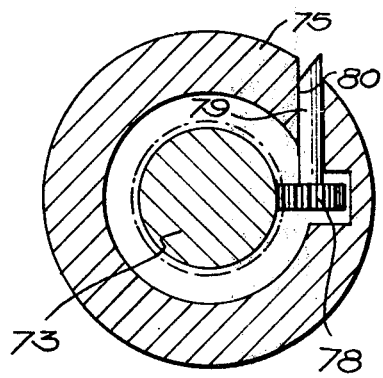

DEVICE FOR INDICATING THE OPERATIVE POSITION OF A VALVE

This invention relates to indicators for use with rotary actuators. There are a number of situations wherein a rotary actuator is used to control an element, and wherein movement of the actuator through more than 360° is necessary to obtain the full required degree of control. In such cases it may be difficult to obtain from the rotary actuator a clear indication by sight or by touch of the condition of the part controlled by the actuator.

According to the present invention a rotary actuator comprises a housing, an actuating member extending through said housing and rotatable but axially fixed relative to said housing, an indicator movable relative to a given surface of said actuating member external of said housing, between a first position substantially flush with or recessed into said surface and a second position projecting from said surface, and means operable on rotation of said actuating member to cause relative movement between said indicator and said surface.

In a rotary actuator according to the invention the indicator is designed so that with the actuating member at one limit of its rotation the indicator lies in its first position substantially flush with or recessed into the given surface. As the actuating member is then rotated towards its other limit position the indicator moves relative to the given surface towards its other limit position projecting from the surface. Thus, the condition of any part operated by rotation of the actuating member may readily be detected by sight or touch of the indicator.

Preferably the actuating member comprises a spindle passing through said housing and a hand wheel secured to the spindle, and the given surface is a surface of the hand wheel. The given surface may be an axial surface of the hand wheel facing away from or towards the housing, or may be a circumferential surface of the hand wheel.

Preferably the indicator is constrained to rotate with the hand wheel.

Conveniently the actuator has a further indicator also movable relative to a given surface of said actuating member external of said housing between a first position substantially flush with or recessed into said surface and a second position projecting from said surface, and means operable on rotation of said actuating member to cause relative movement between said further indicator and said surface.

The invention finds particular utility in actuators wherein rotation of the actuating member is designed to cause axial movement of a controlled element, and where the actuating member itself does not undergo any axial travel. One particular example of this is in a valve which has a valving element driven between axial limit positions by a direct threaded connection between the valving element and a rotary actuating spindle which is itself axially fixed. An indication is needed of the condition of the valve and where rotation of the spindle through more than 360° to cause full travel of the valving element has been necessary it has been difficult to obtain a simple visual or tactile indication of the position of the valving element.

The invention thus extends to a valve incorporating a rotary actuator as aforesaid.

In one convenient arrangement the indicator is a pin slidable in an eccentric bore formed axially through the hand wheel and secured to an internally-threaded nut which engages a threaded section on the housing. Thus, as the hand wheel is rotated the pin transmits the rotary drive to the nut and the thread causes the nut to move axially of the housing and thus causes relative axial movement between the pin and the axial surface of the hand wheel.

In order that the invention may be better understood, examples of valves which embody the invention will now be described in more detail, by way of example only, with reference to the accompanying drawings in which:

FIG. 1 is a cross-section through a valve incorporating an actuator in accordance with a first embodiment of the invention;

FIGS. 2 to 7 are views, partly in section and partly in elevation showing other embodiments of actuator; and FIG. 8 is a cross-section on the line VIII—VIII of FIG. 7.

Referring firstly to FIG. 1, this shows a stop-valve as described in my U.S. application Ser. No. 773,133 filed Feb. 20, 1977, the entrie contents of which are incorporated herein by reference. The valve comprises a sleeve 1 accommodated in a socket of a valve body 2 and secured to the body by studs and nuts 3 the studs passing through a bonnet 4. The sleeve 1 has an open inner end 5 constituting an inlet port and has an outlet port 6 formed through a side wall. A valve seat 7 is formed surrounding the inlet port and a valving element 8 is axially movable within the sleeve 1 from the position shown in FIG. 1, wherein the valve is closed, to a position wherein the lower end 9 of the spool is raised above the outlet opening 6 and the valve is fully opened. Axial movement of the valving element is effected by rotation of an actuating spindle 10 having an externally threaded section 11 which engages an internally threaded section 12 of the valving element. The spindle 10 is axially fixed within the sleeve and is supported by a thrust bearing 13 which resists the axial thrust on the spindle due to the pressure of fluid within the system in which the valve is incorporated.

The spindle 10 passes through the bonnet of the valve and has an end 14 of non-circular cross-section onto which a hand wheel 15 is fitted and secured by a retaining nut 16. An upper section of the sleeve has an externally threaded part 17 on which is engaged an internally threaded nut 18. Two pins 19 and 20 are secured to the nut against both axial movement and rotation, and the pins extend through axially extending eccentric bores 21 and 22 in the hand wheel, the pins being free to slide within the bores.

Operation of the valve will now be clear. As the hand wheel is rotated to move the valving member upwardly from the position shown in FIG. 1, the pins 19 and 20 will transmit the rotary drive to the nut 18 and rotation of this nut relative to the sleeve will cause the nut to move axially along the threaded section 17. This axial movement causes an axial movement of the pins 19 and 20 relative to the hand wheel so that when the valving member reaches its opposite limit of travel, the pins 19 and 20 project above the surface of the hand wheel 15 as indicated in broken lines in FIG. 1. Thus, with the valve closed, the pin 17 is substantially flush with the hand wheel surface, whereas with the valve open the pin projects from that surface. This gives a clear indication either visually or by touch alone as to whether the valve is open or closed.

It will be understood that the arrangement shown in FIG. 1 is not limited to the provision of two pins 19, 20 connected to the nut 18, and it is equally possible only to use a single pin or to use more than two pins.

FIG. 1 shows the pins 19 and 20 as being of equal length and a modified version of the actuator is shown in FIG. 2 wherein the pins 23 and 24 are of different lengths. These pins again pass through axially eccentric bores in a hand wheel 25 and the pins are secured to a nut 26 which is threadably engaged with threads 27 on the outside of a section of the sleeve. With the nut at its lowest limit of travel the pin 24 will lie substantially flush with that surface 28 of the hand wheel which faces away from the housing 29, and the pin 23 will be recessed into that surface. In the intermediate position shown the pin 24 projects from the surface while pin 23 is substantially flush with the surface. In the uppermost position of the nut both the pins 23 and 24 will project from the surface. This form of actuator is used for a three-position valve, the three different positions being indicated by no pins projecting from the surface, by one pin projecting or by two pins projecting.

FIG. 3 shows a version of the actuator which is suitable for use when immersed in water, even at considerable depth. The actuator comprises a housing 30 through which an operating spindle 31 passes, the spindle being connected to a hand wheel 32. The hand wheel has a skirt 33 surrounding an externally threaded section 34 of the housing. A sealing ring 35 is provided between the inner circumference of the free edge of the skirt 33 and a groove 36 formed around the housing. Further sealing rings 37 and 38 are provided between pins 39 and 40 extending through axially eccentric bores in the hand wheel 32, the pins being secured to a nut 41 which is threadably engaged on the section 34 of the housing. The skirt 33 is formed with two vents 42 and 43 and a sealing band 44 of resilient material is placed around the outer circumference of the skirt to cover the vents. The space within the skirt is packed with a water-resistant grease. It will be seen that the sealing rings 35, 37 and 38 prevent flow of water into the space within the skirt 33, and the sealing band 44 prevents water entering through the vents 42 and 43. If pressure relief from within the housing 36 should be required, then such relief can occur through the vents 42 and 43 if the pressure within the skirt exceeds the external pressure.

In the actuator shown in FIG. 4 a spindle 45 is again rotated by means of a hand wheel 46 having a skirt 47. The hand wheel has an eccentric bore 48 in which is mounted an internally threaded sleeve 49, the sleeve being rotatable within the bore and being held in axial position by a circlip 50. The inner end of the sleeve 49 has a pinion 51 which meshes with teeth formed round a section 52 of the housing. An externally threaded pin 53 is engaged with the threads within sleeve 49 and has at its inner end a pinion 54 engaged with teeth on a further section 55 of the housing. The gear ratios between pinion 51 and section 52 and between pinion 54 and section 55 are different. Thus, as the hand wheel is rotated both the sleeve 49 and pin 53 will rotate and because of the different gear ratios there will be resultant rotation between the pin and the sleeve so that there will be axial movement of the pin relative to the sleeve. Thus, the pin may be driven between a position flush with the surface of the hand wheel and a position raised above that surface so giving an indication of the position of an element controlled by the spindle. This form of the invention is useful when it is necessary to make many turns of the hand wheel to achieve the desired control and only a relatively small movement of the indicator pin is required. The reduction gearing for the indicator can be designed to produce the required limited amount of travel.

In the embodiment shown in FIG. 5 the operating spindle 56 passes through the housing 57 and terminates in a square section end 58 over which a hand wheel 59 is fitted in such a way that there may be relative axial movement between the end 58 and the hand wheel. The hand wheel has a skirt 60 with an internally threaded section 61 which engages threads 62 formed on the upper end of the housing 57. In this case it will be seen that, as the hand wheel 59 is turned to rotate the spindle and so operate the valve, the hand wheel itself moves axially due to the engaging threads 61 and 62 and there is thus relative axial movement between the hand wheel and the end 58 of the spindle. The relative positions of the end of the spindle and the hand wheel will thus give an indication by sight or touch of the condition of a valve or other element operated by the actuator.

Referring now to FIG. 6 this shows a housing 63 through which a spindle 64 passes, the spindle being connected to rotate with a hand wheel 65. The housing 63 has an externally threaded section 66 and the hand wheel has a skirt 67 which surrounds the section 66. An internally threaded nut 68 engages the threaded section 66 and the nut carries an indicator in the form of a pin 69. The pin passes through an axially extending slit 70 in the skirt 67 and is thereby constrained to rotate with the skirt. Such rotation causes the nut and thus the pin 69 to move axially on the threaded section 66 so that the pin can move between the first position shown in FIG. 6 wherein the pin lies in a radial groove 71 formed in the axial surface of the hand wheel which faces towards the housing, and a further limit position shown in broken lines wherein the pin projects from that surface.

Clearly, two or more axially spaced pins may be secured to the nut 68, such pins preferably also projecting from the nut at different radial angles.

In the arrangement shown in FIGS. 7 and 8 the housing 72 has an externally threaded section 73 and a spindle 74 extends through this section and is connected to a hand wheel 75. The hand wheel has a skirt 76 part of which is cut away to form a chamber 77 in which is housed a worm wheel 78 meshing with the threaded section 73 of the housing. The worm wheel 78 is carried by a pin 79 passing through a bore 80 in the hand wheel. Rotation of the hand wheel will cause rotation of the worm wheel and thus result in rotation of the pin 79 within the bore. In one limit position as shown in FIG. 8 the end of the pin projects from the circumferential surface of the hand wheel into which the bore opens. In the other limit position the pin has been rotated through 180° so that the end of the pin then lies substantially flush with the open end of the bore 80.

It will be appreciated that many other different drives can be designed for causing relative movement between an indicator pin and a surface on rotation of the spindle of a valve and the invention is not limited to the particular forms shown in these drawings.

It will also be appreciated that the invention is not limited to use as an integral part of a valve. Thus, the invention is equally applicable to a rotary actuator designed to be used remote from a valve or other equipment which is to be operated, the actuator having an actuating member in the form of a flexible connection or a long spindle extending to the equipment. The invention may also be used in conjunction with apparatus such as screw jacks which are operative by a captive hand wheel and of rotary isolators for electric circuits, such isolators again being controlled by a hand wheel. Other apparatus wherein it is advantageous to incorporate an actuator according to the invention may readily be thought of.

What we claim is:

1. A rotary actuator comprising:
a housing having a bore therein;
a spindle having first and second ends and extending through and being rotatable in the bore of said housing;
means securing said spindle against axial movement within the bore;
a rotatable actuating member located wholly outside said housing and coupled to said first end of said spindle whereby rotation of said actuating member causes rotation of said spindle;
at least one indicator for indicating the position of means to be connected to the second end of said spindle and to be controlled by said actuating member, said indicator being located wholly outside said housing and out of axial alignment with said spindle, said indicator being rotatable with said actuating member and being movable upon rotation of said actuating member relative to a given surface of said actuating member between first position substantially flush with or recessed into said surface and a second position projecting from said surface; and
coupling means between an outer surface of said housing and said indicator to cause movement of said indicator between said first and second positions on rotation of said actuating member.

2. A rotary actuator according to claim 1 in which said actuating member is a hand wheel and said given surface is an axial surface of said hand wheel which faces away from said housing.

3. A rotary actuator according to claim 2 in which said indicator is a first pin movable in a bore formed axially in, and eccentric of, said hand wheel.

4. A rotary actuator according to claim 3 comprising a further indicator, in the form of a second pin movable in a second bore formed axially in, and eccentric of, said hand wheel, and further coupling means between said outer surface of said housing and said further indicator to cause movement of said further indicator between a first position substantially flush with or recessed into said given surface and a second position projecting from said surface on rotation of said actuating member.

5. A rotary actuator according to claim 4 in which said two bores are equally eccentric from the axis of said hand wheel.

6. A rotary actuator according to claim 5 in which said first pin and said second pin are of equal length.

7. A rotary actuator according to claim 5 in which said first pin is shorter than said second pin.

8. A rotary actuator according to claim 3 in which said coupling means comprises an external thread on said outer surface of said housing and an internally threaded nut which engages said external thread, said first pin being secured to said nut.

9. A rotary actuator according to claim 8 in which said hand wheel has a skirt extending axially to surround said externally threaded surface of said housing.

10. A rotary actuator according to claim 9 in which sealing means are provided between the inner circumference of the free edge of said skirt and a part of said housing, and sealing means are provided between said first pin and said bore.

11. A rotary actuator according to claim 10 in which a vent is formed radially through said skirt and a sealing band of resilient material is placed around the outer circumference of said skirt to cover said vent.

12. A rotary actuator according to claim 3 in which said coupling means comprises an external thread on said first pin, an internally threaded sleeve extending through said bore and axially captive but rotatable relative to said bore, said threads on said first pin engaging said threads in said sleeve, a first pinion formed at one end of said sleeve, a first toothed section on said outer surface of said housing, said first pinion engaging said first toothed section, a second pinion formed at one end of said first pin, a second toothed section on said outer surface of said housing, said second pinion engaging said second toothed section, both said toothed sections being coaxial with said spindle, and the gear ratio between said first pinion and said first toothed section being different from the gear ratio between said second pinion and said second toothed section.

13. A rotary actuator according to claim 1 in which said actuating member is a hand wheel and said given surface is an axial surface of said hand wheel which faces towards said housing.

14. A rotary actuator according to claim 13 in which said coupling means comprises an external thread on said outer surface of said housing and an internally threaded nut which engages said external thread, said indicator being a first pin secured to said nut to extend perpendicular to the axis of said spindle, and in said first position lying in a radial groove or slot formed in said axial surface of said hand wheel which faces towards said housing, and being movable axially out of said groove towards its second position.

15. A rotary actuator according to claim 14 in which said hand wheel has a skirt extending axially to surround said threaded outer surface of said housing, and said skirt is formed with an axially extending slit through which said pin passes.

16. A rotary actuator according to claim 14 comprising a further indicator in the form of a second pin extending radially from said nut at an angle to said first pin.

17. A rotary actuator according to claim 16 in which said first pin is spaced axially from said second pin.

18. A rotary actuator according to claim 1 in which the actuating member is a hand wheel and said given surface is a circumferential surface of said hand wheel.

19. A rotary actuator according to claim 18 in which said indicator is a first pin rotatable in a bore in said hand wheel, said bore opening at one end into a chamber within said hand wheel and at the other end into the circumference of said hand wheel and having an axis lying in a plane perpendicular to the axis of said hand wheel, said first pin has a first end shaped to lie flush with or recessed into said circumference in one angular position of said first pin but projecting from said circumference in another angular position of said first pin and said coupling means comprises a worm wheel on a second end of said first pin and external threads on said outer surface of said housing, said worm wheel engaging said threads.

20. A rotary actuator according to claim 1 comprising a further indicator located wholly outside said housing and out of axial alignment with said spindle, said further indicator being rotatable with said actuating member and being movable relative to a given surface of said actuating member between a first position substantially flush with or recessed into said surface and a second position projecting from said surface, and coupling means between an outer surface of said housing and said further indicator to cause movement of said further indicator between said first and second positions on rotation of said actuating member.

21. A rotary actuator according to claim 20 comprising a plurality of further indicators.

22. A rotary actuator according to claim 1 in which said spindle is connected to controlled means mounted within said housing whereby rotation of said actuating member causes axial movement within said housing of said controlled means.

23. A rotary actuator according to claim 22 in which said controlled means comprises a valving element for controlling fluid flow through a valve.

24. A rotary actuator comprising:
 a housing having a bore therein;
 a spindle having first and second ends and extending through and being rotatable in the bore of said housing;
 means securing said spindle against axial movement within the housing;
 a rotatable actuating member located wholly outside said housing and coupled to said first end of said spindle whereby rotation of said actuating member causes rotation of said spindle;
 means controlled by said actuating member, said means being connected to the second end of said spindle;
 at least one indicator for indicating the position of said controlled means, said indicator being located wholly outside said housing and out of axial alignment with said spindle, said indicator being rotatable with said actuating member and being movable upon rotation of said actuating member relative to a given surface of said actuating member between a first position substantially flush with or recessed into said surface and a second position projecting from said surface; and
 coupling means between an outer surface of said housing and said indicator to cause movement of said indicator between said first and second positions on rotation of said actuating member.

25. An actuator as claimed in claim 24, wherein:
 said controlled means is directly connected to the second end of said spindle and is axially movable within said housing upon rotation of said actuating member.

* * * * *